(12) United States Patent
Ekonen et al.

(10) Patent No.: US 11,365,770 B2
(45) Date of Patent: Jun. 21, 2022

(54) SELF-ENERGIZING ELECTROMAGNETIC DISCONNECT ACTUATOR

(71) Applicants: LINAMAR CORPORATION, Guelph (CA); Todd R Ekonen, Brighton, MI (US); Gary Monkaba, Troy, MI (US); Steven Nance, Grosse Ile, MI (US); Matt Griffith, Orion Township, MI (US); Tod Verville, Milford, MI (US)

(72) Inventors: Todd R Ekonen, Brighton, MI (US); Gary Monkaba, Troy, MI (US); Steven Nance, Grosse Ile, MI (US); Matt Griffith, Orion Township, MI (US); Tod Verville, Milford, MI (US)

(73) Assignee: Linamar Corporation, Guelph (CA)

( * ) Notice: Subject to any disclaimer, the term of this patent is extended or adjusted under 35 U.S.C. 154(b) by 38 days.

(21) Appl. No.: 16/487,613

(22) PCT Filed: Feb. 21, 2018

(86) PCT No.: PCT/US2018/018946
§ 371 (c)(1),
(2) Date: Aug. 21, 2019

(87) PCT Pub. No.: WO2018/156576
PCT Pub. Date: Aug. 30, 2018

(65) Prior Publication Data
US 2020/0063806 A1   Feb. 27, 2020

Related U.S. Application Data

(60) Provisional application No. 62/461,392, filed on Feb. 21, 2017.

(51) Int. Cl.
*F16D 27/108* (2006.01)
*F16D 27/118* (2006.01)
(Continued)

(52) U.S. Cl.
CPC .......... *F16D 27/108* (2013.01); *F16D 27/118* (2013.01); *F16D 48/064* (2013.01); *B60K 23/08* (2013.01); *B60K 2023/085* (2013.01)

(58) Field of Classification Search
CPC .... F16D 27/108; F16D 27/118; F16D 48/064; B60K 23/18; B60K 2023/085
See application file for complete search history.

(56) References Cited

U.S. PATENT DOCUMENTS 6,098,770 A * 8/2000 Isley, Jr. ................ F16D 23/12
192/35
8,905,208 B2 * 12/2014 Sawada ................ F16D 27/108
192/35
(Continued)

FOREIGN PATENT DOCUMENTS

WO   2012145580   10/2012

*Primary Examiner* — Stacey A Fluhart
(74) *Attorney, Agent, or Firm* — Miller Canfield

(57) ABSTRACT

A disconnect system for selectively engaging and disengaging one or more shafts of a power train unit. The disconnect system includes a plurality of cam members and an electromagnetic coil. At least one cam member rotates at the same speed as an input shaft. At least one cam member rotates at variable speeds. In operation, the electromagnetic coil is energized by rotation of the input shaft for selectively activating a clutch to engage one or more of the cams to connect and disconnect one or more output shafts.

16 Claims, 18 Drawing Sheets

(51) Int. Cl.
  *F16D 48/06*    (2006.01)
  *B60K 23/08*    (2006.01)

(56) References Cited

U.S. PATENT DOCUMENTS

| | | | |
|---|---|---|---|
| 2013/0327610 A1* | 12/2013 | Sawada | F16D 11/14 |
| | | | 192/69.9 |
| 2015/0165901 A1* | 6/2015 | Tamoto | B60K 17/3462 |
| | | | 475/230 |
| 2015/0380144 A1 | 12/2015 | Heravi et al. | |
| 2017/0198801 A1* | 7/2017 | Onitake | F16D 27/108 |
| 2018/0038422 A1* | 2/2018 | Yoshisaka | F16D 11/14 |

* cited by examiner

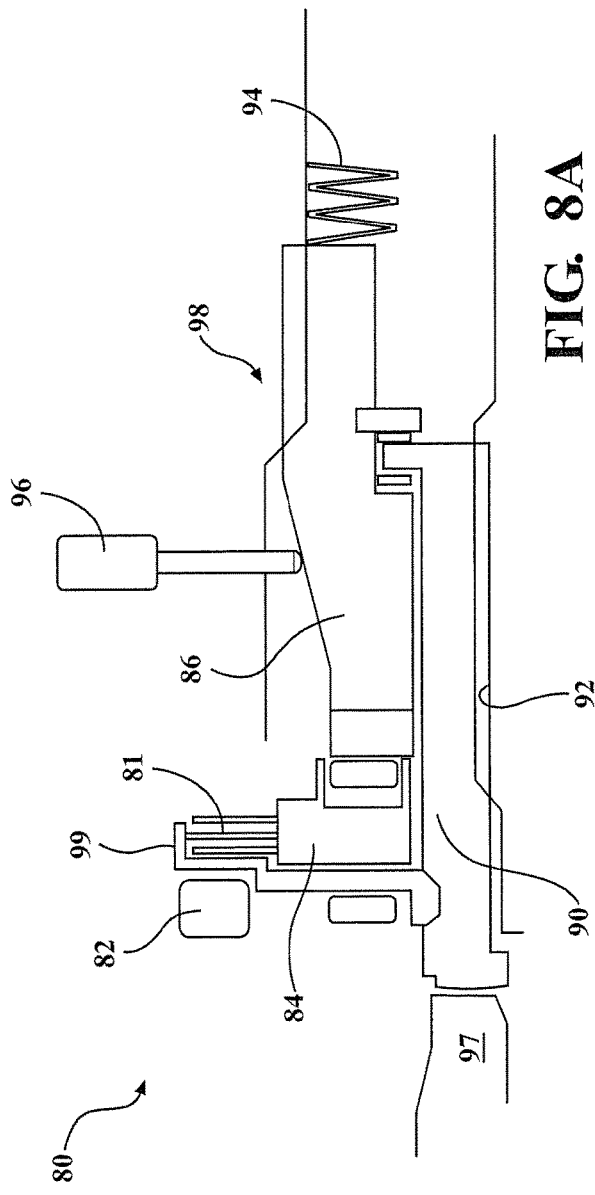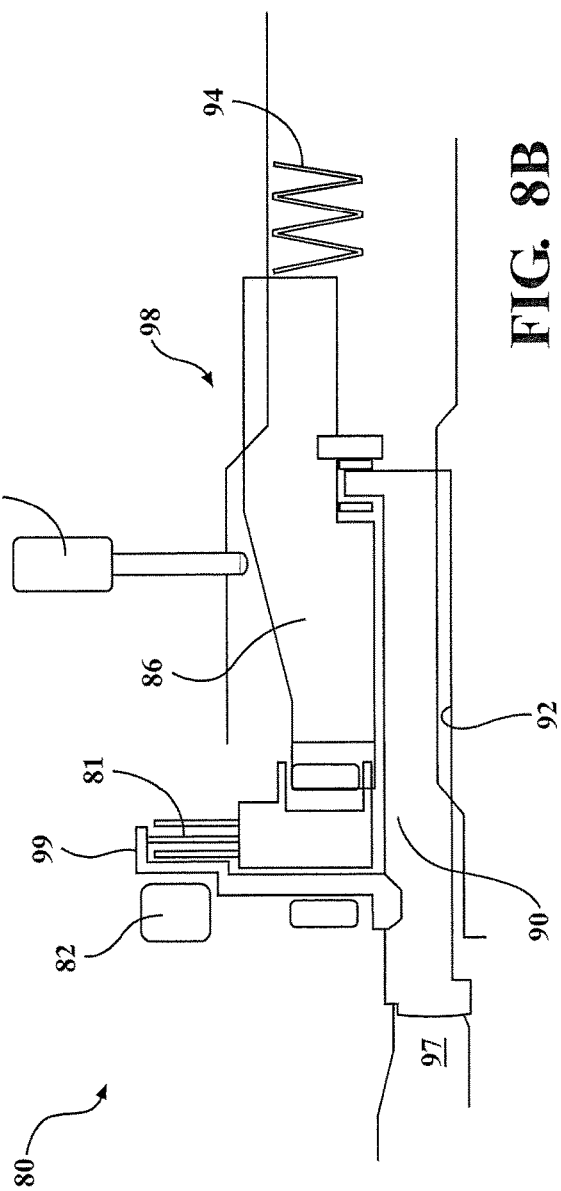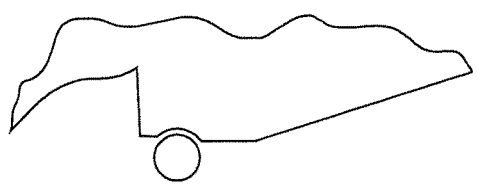

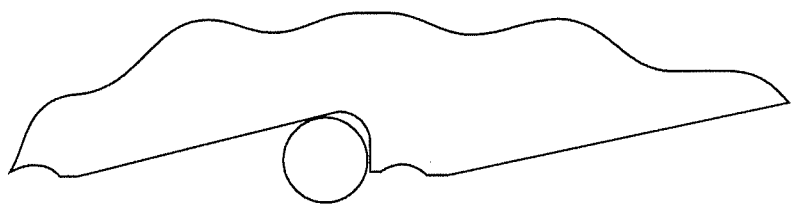
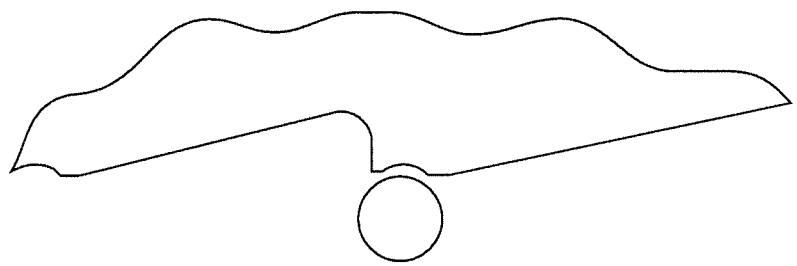
FIG. 9A

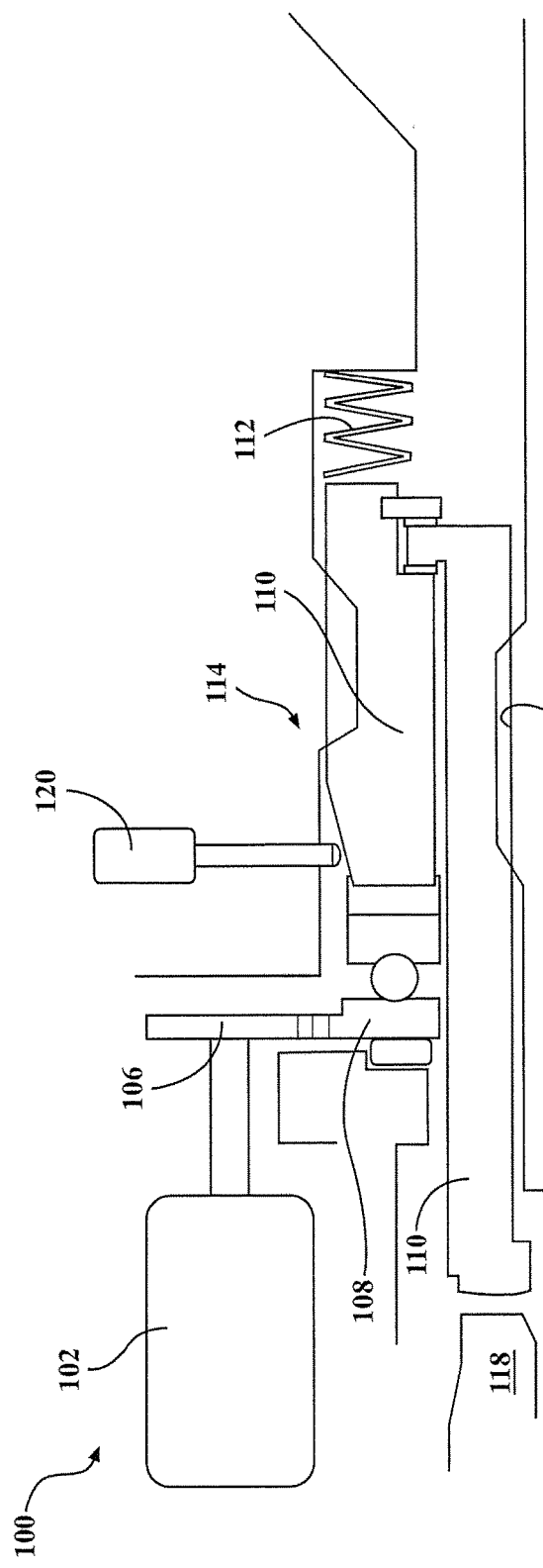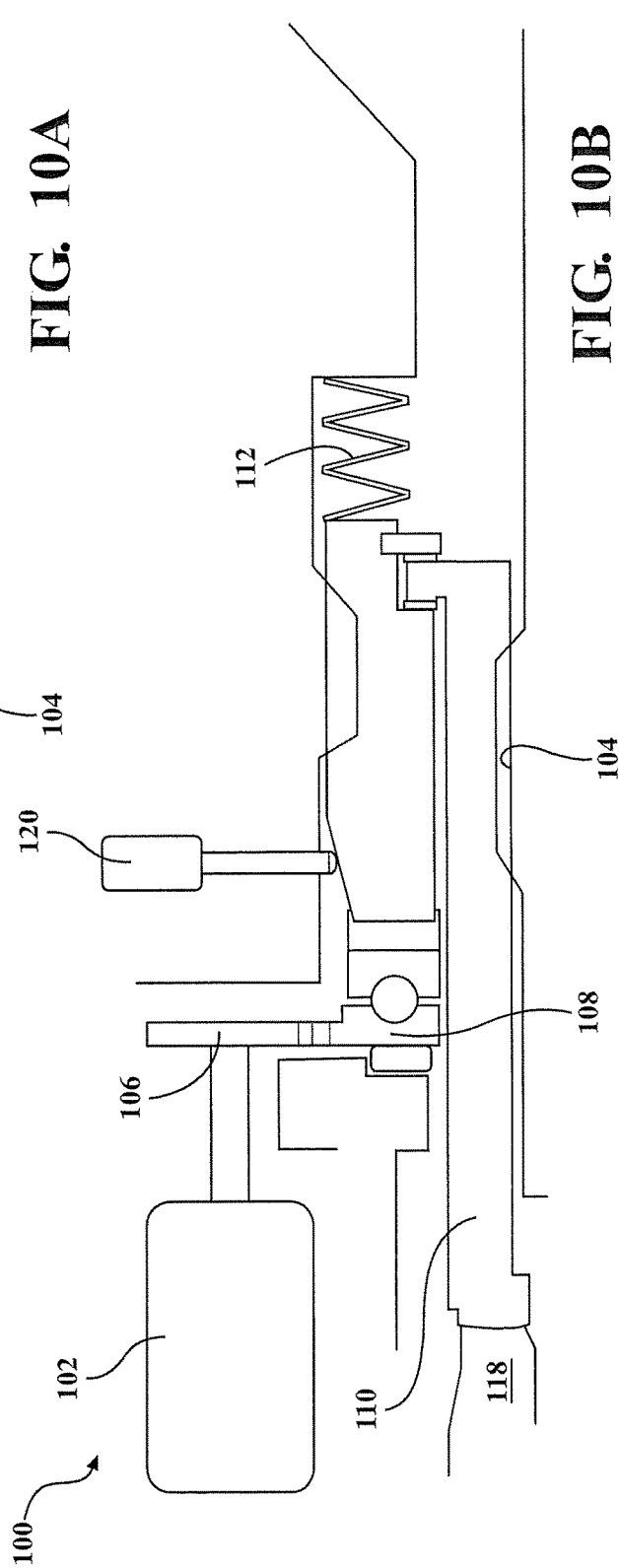

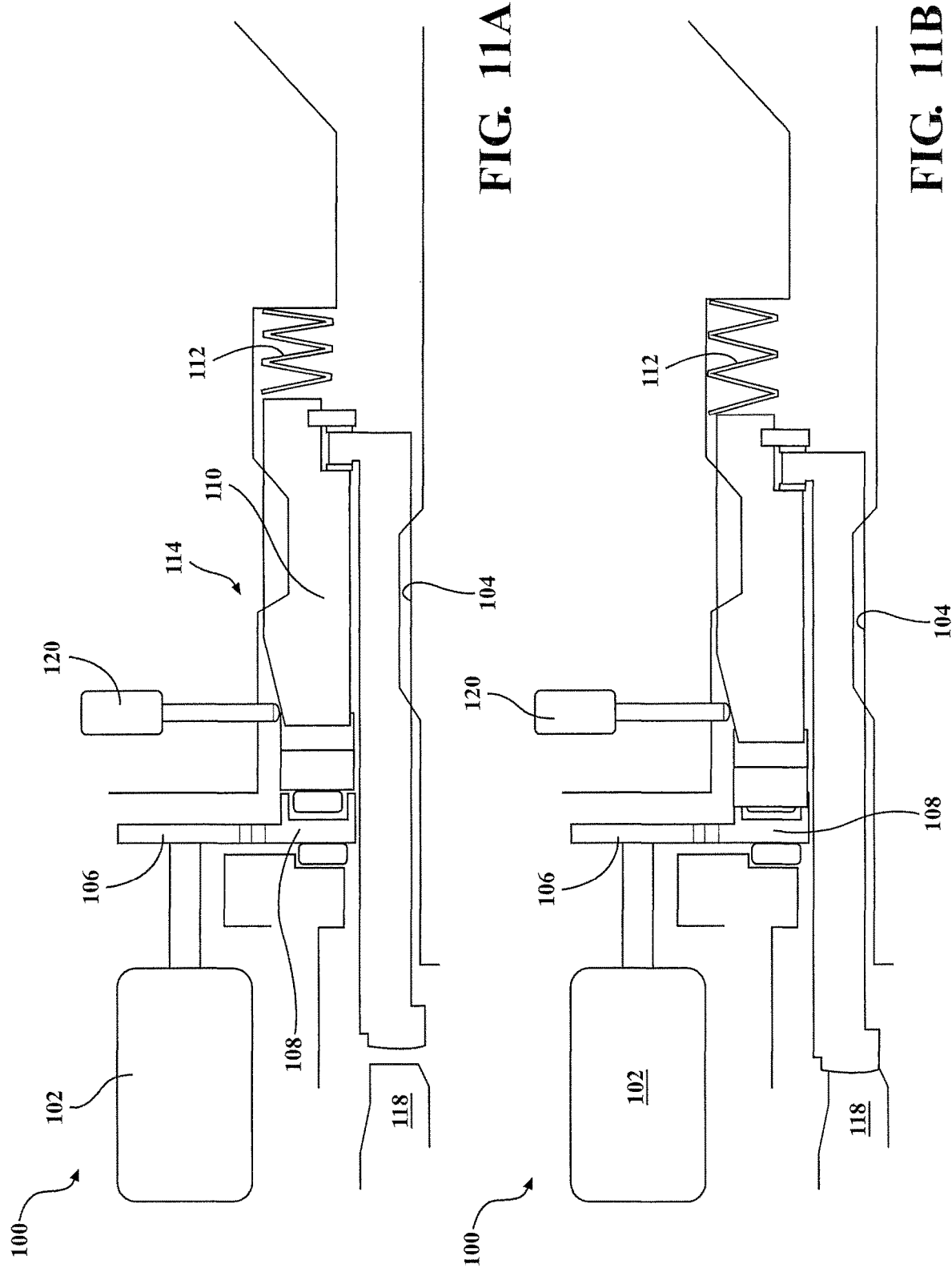

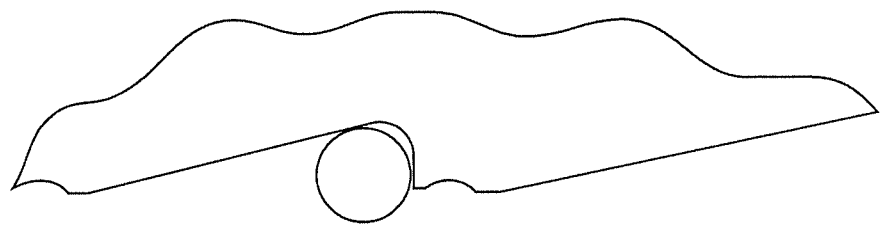
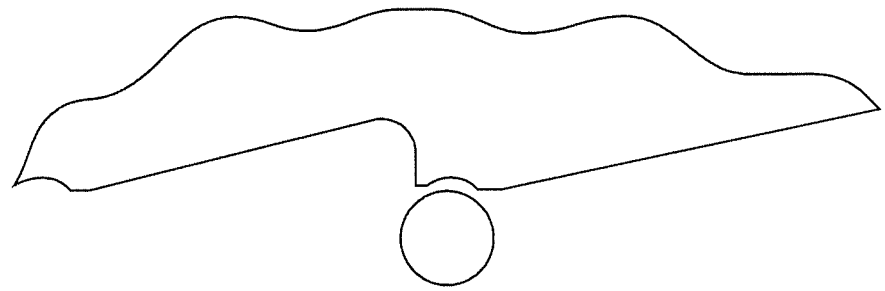
FIG. 12

SELF-ENERGIZING ELECTROMAGNETIC DISCONNECT ACTUATOR

CROSS-REFERENCE TO RELATED APPLICATIONS

This application claims priority to U.S. provisional patent application No. 62/461,392, filed Feb. 21, 2017 which is hereby incorporated by reference in its entirety.

TECHNICAL FIELD

The present disclosure relates to a disconnect system for selectively connecting and disconnecting components of an all-wheel drive system. More particularly, the present disclosure relates to a disconnect system comprising one or more cam members and a clutch for selectively engaging and disengaging one or more components of an all-wheel drive system.

BACKGROUND

All-wheel drive (AWD) capable vehicles have a number of advantages over vehicles with drivelines connected to only a single axle. Specifically, AWD capable vehicles tend to have increased traction and enhanced drivability over similar vehicles driven using only a single axle.

Traditional AWD vehicles generally consist of permanently engaged front and rear drive axles in which there is continuous rotation of certain parts of the AWD driveline assembly, including the second drive axle and other portions of the driveline, even when the performance or benefits of the AWD driveline assembly are not required. As a result, traditional AWD vehicles tend to have reduced fuel and overall efficiency when compared to vehicles driven using only a single axle.

Some AWD vehicles mitigate these performance losses by incorporating AWD disconnect systems. AWD disconnect systems are designed to improve fuel, and other efficiencies for an AWD vehicle by disconnecting the major rotating driveline components of an AWD driveline assembly and place the vehicle into a single-drive mode when the performance or benefits of the AWD driveline assembly are not needed. In such vehicles, the AWD driveline assembly is preferably connected only if it will likely provide a performance benefit, such as to improve the operation of the vehicle in slippery conditions. Once the second drive axle is disconnected, there is no transfer of torque to the second drive axle. As a result, speed-dependent losses associated with the second drive axle and other associated driveline components are eliminated by allowing them to remain in an idle condition.

Vehicles can include a disconnectable power transfer unit (PTU) and a rear driveline module or unit (RDM/RDU) which allow switching of the operation of the vehicle between two-wheel and four-wheel drive modes. During two-wheel drive mode, the RDM and PTU may be disconnected to minimize energy losses and provide better fuel efficiency.

Secondary driveline disconnect systems may also use a shift sleeve, typically a motor or cam-driven motor or may utilize electromagnetic actuators to perform engagement and disengagement of a secondary driveline. Typical disconnect systems use an external power source such as a motor to power the disconnect system. The motors for such systems often require high current (on the order of 30 to 40 amperes) and are often expensive and complex as the power source for the disconnect system tends not to be on the same axis as the rest of the components. Further, such systems often have a slow response time as the power from the motor has to be transferred to a shift mechanism that then engages the disconnect system. Additional difficulties with existing systems may be appreciated in view of the Detailed Description of Example Embodiments, below.

SUMMARY OF THE INVENTION

There is disclosed a disconnect system comprising an electromagnetic coil or other power source, a clutch and one or more cam members. The electromagnetic coil or power source activates the clutch, which then selectively engages one or more cam members to disconnect an output of components within an AWD system. The disconnect system may use the power from the vehicle such that an external power source is not required to disconnect the components. The coil and the clutch are configured to selectively engage and hold one of the cam members, and the power from the other components of the drive line is used to rotate the remaining components of the disconnect system relative to the cam member that has been engaged by the coil.

In one broad aspect, there is disclosed a disconnect system for selectively engaging and disengaging one or more shafts. The disconnect system includes an input shaft, at least one first cam member driveably connected to the input shaft and configured to rotate at the same speed as the input shaft, at least one second cam member driveably connected to the at least one first cam member and configured to rotate at variable speeds, and at least one clutch driveably connected to the input shaft and the at least one second cam member. The system also includes an output shaft driveably connected to the at least one second cam member, and a coil driveably connected to the at least one second cam member, wherein the coil is selectively energized and de-energized by rotation of the drive shaft, and the coil activates the clutch, the clutch selectively engages and disengages rotation of the at least one second cam member relative to the at least one first cam member to translate a rotational movement of the at least one second cam member to an axial movement and the input shaft rotates the at least one first cam member relative to the at least second cam member to engage and disengage the output shaft.

In some embodiments, the coil is electromechanically actuated. In some embodiments, the disconnect system further includes a biasing member operatively coupled to the clutch for selectively engaging the clutch. In some embodiments, the biasing member is a spring.

In some embodiments, the disconnect system may include a housing at least partially surrounding the disconnect system.

In some embodiments, the disconnect system includes a control system configured to control the selective engagement and disengagement of the coil.

In some embodiments the output shaft is the output of a power train or an axle and in some embodiments, axial movement of the second cam member is controlled by a detent mechanism including in some embodiments, a ramp traversing a distance between the first and second cam members.

In some embodiments, the disconnect system may be embodied in a vehicle.

In another broad aspect, there is disclosed a disconnect system for selectively engaging and disengaging one or more shafts. The disconnect system includes an input shaft, at least one first cam member driveably connected to the input shaft and configured to rotate at the same speed as the input shaft, and at least one second cam member driveably connected to the at least one first cam member and configured to rotate at variable speeds. The disconnect system also includes at least one clutch driveably connected to the input shaft and the at least one second cam member, an output shaft driveably connected to the at least one second cam member, and a power source driveably connected to the at least one second cam member wherein the power source activates the clutch, the clutch selectively engages and disengages rotation of the at least one second cam member relative to the at least one first cam member to translate a rotational movement of the at least one second cam member to an axial movement and the input shaft rotates the at least one first cam member relative to the at least second cam member to engage and disengage the output shaft.

In some embodiments, the disconnect system further includes a biasing member operatively coupled to the clutch for selectively engaging the clutch. In some embodiments, the biasing member is a spring.

In some embodiments, the first and second cam members are one or more of a ball cam and a roller cam.

In some embodiments, the disconnect system includes a control system configured to control the selective engagement and disengagement of the one or more first and second cam members.

In some embodiments the output shaft is the output of a power train or an axle and in some embodiments, axial movement of the second cam member is controlled by a detent mechanism.

In some embodiments, the disconnect system may be embodied in a vehicle.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 8A is a cross sectional view of a disconnect system according to another embodiment of the present disclosure in a first disengaged position;

FIG. 8B is a cross sectional view of a disconnect system according to another embodiment of the present disclosure in a second disengaged position;

FIG. 9A is a diagram showing the operation of the disconnect system of FIG. 8A in the engaged (right) and disengaged (left) position;

FIG. 10A is a cross sectional view of a disconnect system according to another embodiment of the present disclosure in a first disengaged position;

FIG. 10B is a cross sectional view of a disconnect system according to another embodiment of the present disclosure in a second disengaged position;

FIG. 11A is a cross sectional view of a disconnect system according to another embodiment of the present disclosure in a first disengaged position;

FIG. 11B is a cross sectional view of a disconnect system according to another embodiment of the present disclosure in a second engaged position; and FIG. 12 is a diagram showing the operation of the disconnect system of FIGS. 11A and 11B in the engaged (right) and disengaged (left) position.

Similar reference numerals may have been used in different figures to denote similar components.

DETAILED DESCRIPTION OF EXAMPLE EMBODIMENTS

The present disclosure is directed to a disconnect system located within the driveline of a vehicle. Specifically, the present disclosure is directed to a compact disconnect system which may in some embodiments be a self-energizing electromagnetic coil or power source for connecting and disconnecting the output of components within an AWD system, including but not limited to the powertrain unit (PTU), or an axle. The system also includes a clutch and a cam system comprising one or more cam members. In accordance with one embodiment, a momentary low level current generated by rotation of an input shaft is used to activate an electromagnetic clutch cam system to convert the driveline rotation of the input shaft to axial (linear) motion of at least one of the cam members to engage and disengage the input shaft from an output shaft. The input shaft may be connected to the rear wheels of the AWD system thus engaging and disengaging the all-wheel components of a vehicle.

Figure 1:
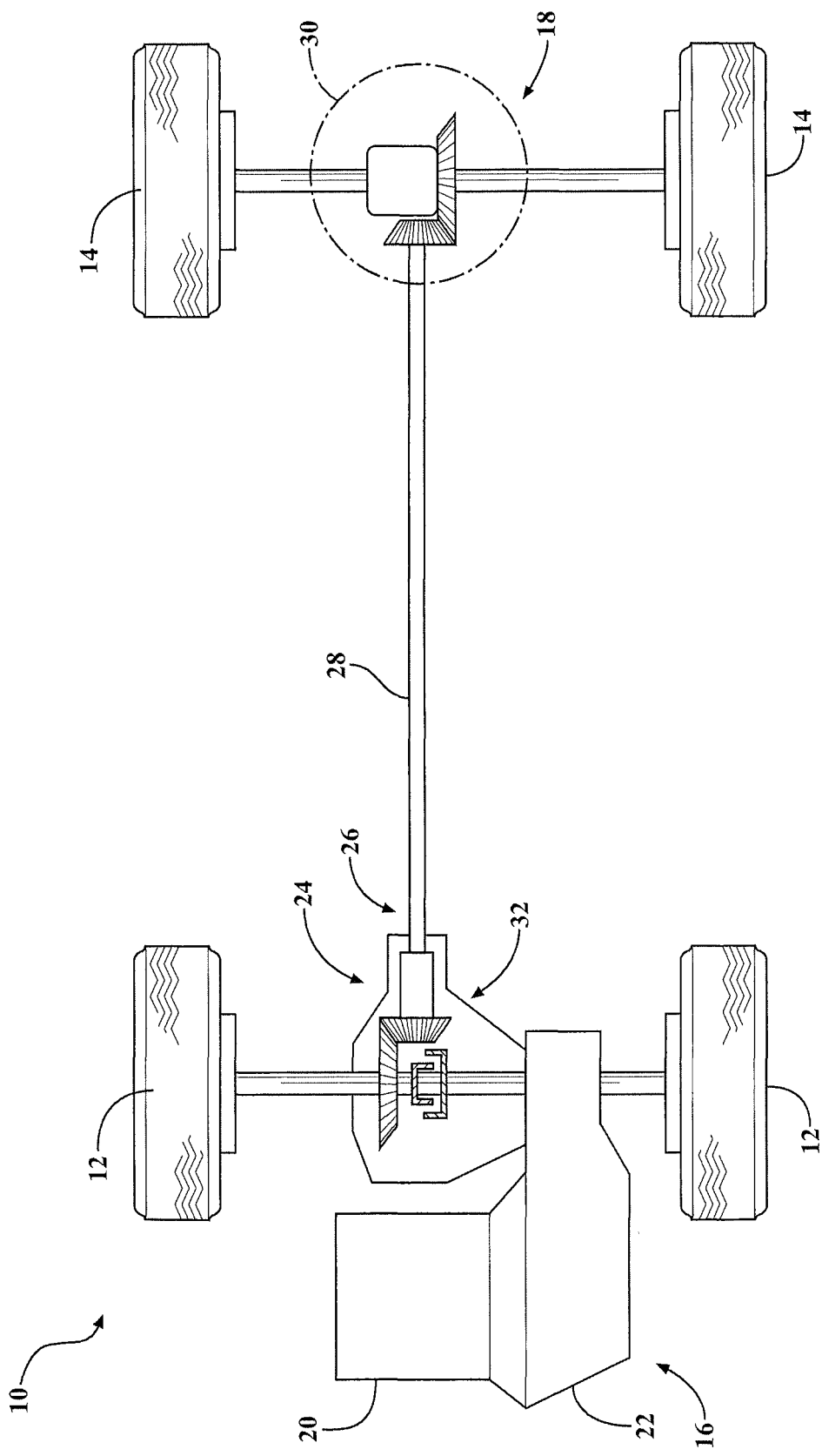
FIG. 1 is a diagram illustrating a vehicle drive train assembly including a disconnect assembly according to an embodiment of the present disclosure.

FIG. 1 illustrates an exemplary vehicle drive train assembly 10 having all wheel drive functionality for transferring torque to a first or main set of wheels 12 and a second or secondary set of wheels 14 of a vehicle. The drive train assembly 10 includes a main or front driveline 16 and a secondary or rear driveline 18. The front driveline 16 includes, among other components, an engine 20, a transmission 22, and a power train unit 24 (PTU). The PTU 24 includes an output 26 to transmit torque through a propeller shaft 28 to secondary drive unit and specifically a rear drive unit or module 30 (RDU/RDM) for driving the rear wheels 14 and a disconnect system 32 according to an embodiment of the present disclosure for selectively engaging and disengaging the secondary drive unit, as described herein. A controller (not shown) may be in communication with the components in the front driveline 16 and rear driveline 18 and also in communication with one or more sensors located throughout the vehicle.

Figure 2A:
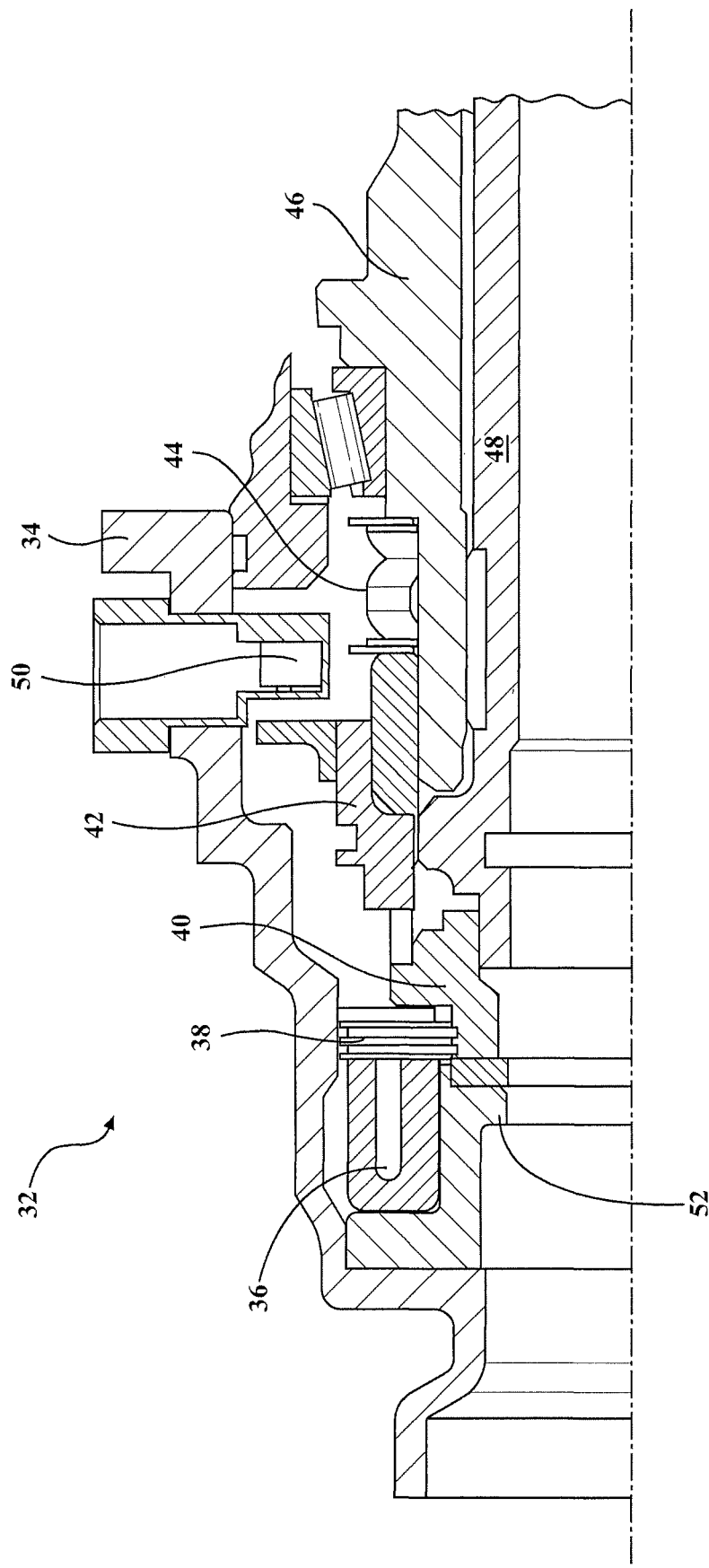
FIG. 2A is a cross sectional view of a disconnect system according to an embodiment of the present disclosure in a first disengaged position.
Figure 2B:
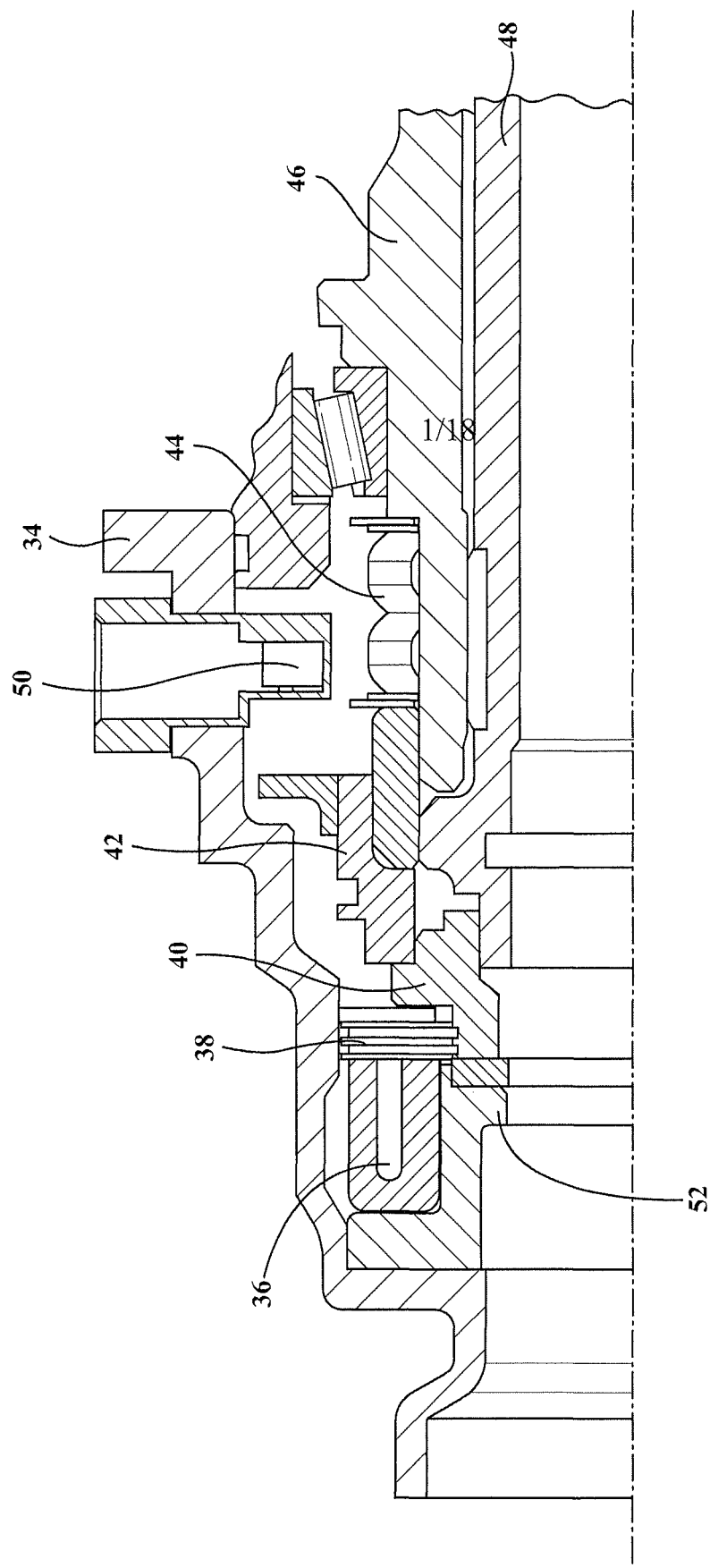
FIG. 2B a cross sectional view of a disconnect system according to an embodiment of the present disclosure in a second engaged position.

A cross-section view of the disconnect system 32 is illustrated in FIGS. 2A and 2B. In the embodiment shown in FIGS. 2A and 2B, disconnect system 32 is a self-energizing compact disconnect actuator used to connect and disconnect the output 26 of the PTU 24 of an AWD disconnect system.

Figure 3:
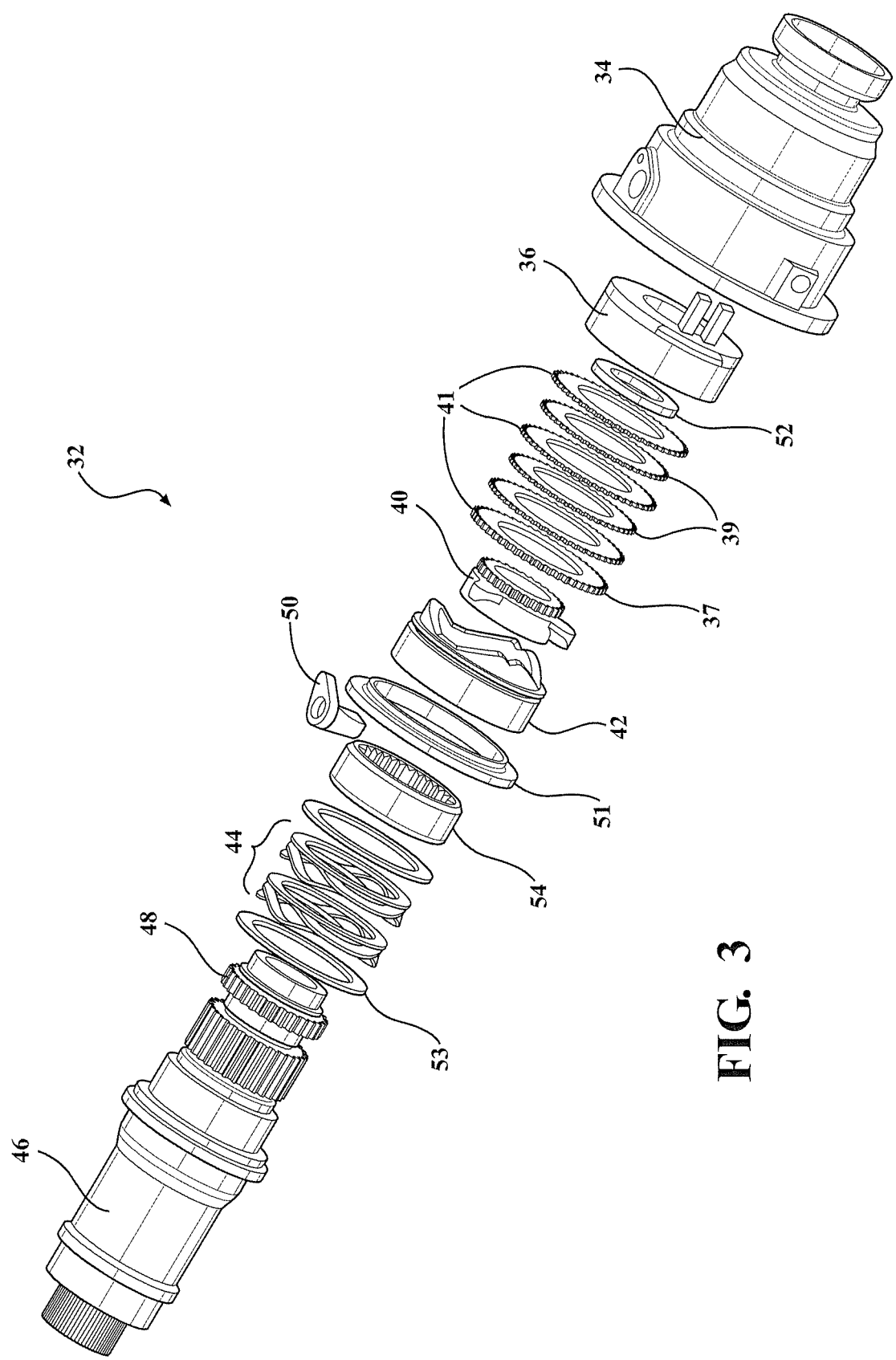
FIG. 3 is an exploded view of a disconnect system according to an embodiment of the present disclosure.
Figure 4:
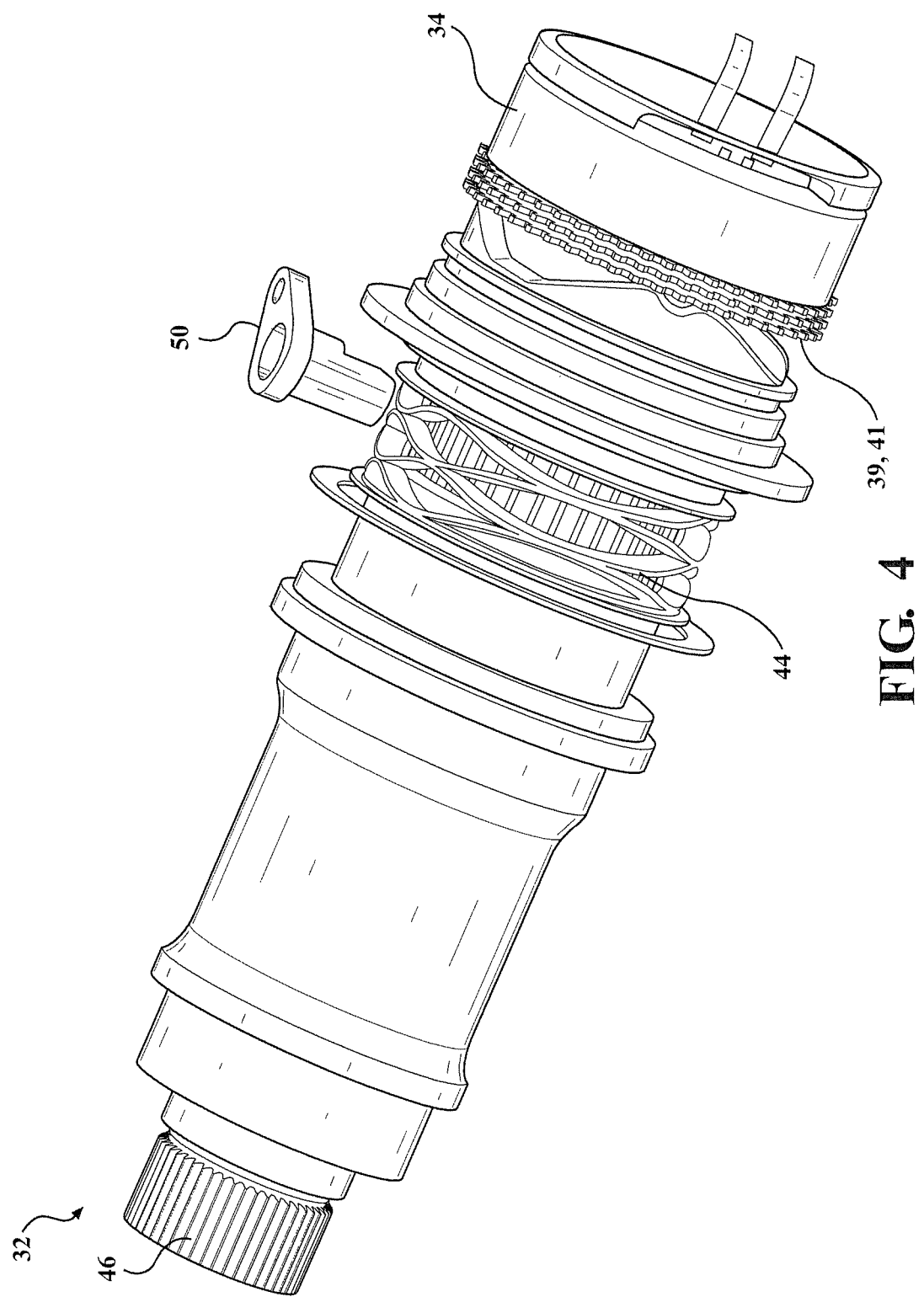
FIG. 4 illustrates the assembled disconnect system of FIG. 3.

Referring to FIGS. 2 to 4, the disconnect system 32 includes a housing 34 which receives and contains one or more of the components of the disconnect system 32, including electromagnetic coil 36 and which may facilitate mounting of the disconnect system 32 to the vehicle. In at least some example embodiments, disconnect system 32 is located in a PTU such as PTU 24.

The coil 36 is selectively energized to engage and disengage one or more components of disconnect system 32. The coil assembly may comprise multiple windings or spools (such as spools 63 shown in FIG. 6D) and may further include one or more coil wires (such as coil wires 64 shown in FIG. 6D) and coil potting 72 (FIG. 6D) to protect components of the coil 36. Disconnect system 32 includes a pilot clutch 38 which may comprise one or more inner plates 39 and outer plates 41 and which may be housed within an armature 37. Disconnect system 32 also includes one or more cam members 40, 42 which may be housed in a shift sleeve assembly 54. The inner plates 39 of pilot clutch 38 are splined to a clutch cam member 40, which in some embodiments may be a rotational clutch cam. The outer plates 41 of pilot clutch 38 are splined to housing 34. Clutched cam member (lower cam) 40 contacts a cam profile on the face of cam sleeve assembly (upper cam) 42. In operation, breaking (or stopping) the rotation of clutch cam 40 when it is connected to cam sleeve assembly 42 converts rotary motion of cam sleeve assembly 42 into axial (linear) motion of the cam sleeve assembly 42. Cam sleeve assembly 42 is operatively connected to output shaft 46 and rotates with output shaft 46 but is configured to move axially relative to output shaft 46. Cam sleeve assembly 42 has spline teeth (such as teeth 76 shown in FIG. 7B) on the internal diameter of cam sleeve assembly 42 and mates with outer diameter spline teeth with a similar tooth profile on input shaft 48, which is operatively connected to cam sleeve assembly 42.

Cam sleeve assembly 42 is connected to a biasing member 44, which in some embodiments may be a spring. It will be understood that other biasing means which provide a similar biasing action may be used. Biasing member 44 is compressed when cam sleeve assembly 42 moves in an axial direction. Disconnect system 32 also includes a sensor 50, which in some embodiments may be a hall effect or linear position transducer. Sensor 50 is part of a control unit (not shown) that monitors the position of cam sleeve assembly 42 and the engagement or disengagement state of disconnect system 32 and may be housed within a sensor ring such as sensor ring 51 shown in FIG. 3. The control unit may include a controller for determining a connection state of an all wheel drive assembly in a vehicle including by monitoring and determining whether the upper cam is connected or disconnected. The controller may include a number of components including a memory; a wireless communications subsystem; and a processor configured to execute a series of instructions in response to a command by a vehicle operator, data received from the controller, or data received (such as data about external conditions of a driving environment) from at least one sensor 50, or a combination thereof to engage or disengage the disconnect system. The electromagnetic coil 36 is in communication with the control unit and the control unit is configured to execute instructions that control the operation of electromagnetic coil 36. Disconnect system 32 also includes one or more thrust bearings 52 and one or more thrust washers 53 that contact one or more of the components of the disconnect system 32 to permit rotation between the various components. In some embodiments, thrust washer 53 acts as a backing plate for biasing member 44.

In operation, disconnect system 32 is configured to move from a disengaged state shown in 2B wherein the cam sleeve assembly 42 is disengaged from the input shaft 48 to an engaged position in which cam sleeve assembly 42 is engaged to input shaft 48.

In the connected state (shown in FIG. 2A) in which the PTU 24 is disengaged, electromagnetic coil 36 is energized by rotational action of one or more of input shaft 48 or output shaft 46. In the energized state, the inner and outer plates of pilot clutch 38 are urged together creating drag between the inner and outer plates. When a vehicle is in motion, output shaft 46 rotates, as output shaft 46 is connected through the rest of the driveline which may include front and rear drivelines 16, 18 and transmission 42. Clutched cam member 40 is connected to the cam sleeve assembly 42, which is itself connected to output shaft 46. Accordingly, clutched cam member 40 is driveably connected to and rotates at the same speed as output shaft 46. Clutch cam 40 is not connected to any rotating components of disconnect system 32 except through pilot clutch 38. As drag in pilot clutch 38 is created due to the movement of the inner and outer plates of pilot clutch 38, the rotational speed of clutch cam 40 is slowed causing relative rotation of clutch cam 40 against cam sleeve assembly 42. The slower rotation of clutched cam member 40 relative to cam assembly 42 causes cam assembly 42 to move axially thus biasing (compressing) the biasing member 44 in one direction which causes it to disengage output shaft 46 from input shaft 48.

In a subsequent step (shown in FIG. 2B), the input and output shafts 46, 48 are connected. To connect the PTU 24, a modulating clutch in the RDM 30 is activated thereby synchronizing the disconnected portion of the driveline to match the speed of input shaft 48. During this synchronization, the output shaft 48 in the PTU 24 rotates to reach this speed. Electromagnetic coil 36 is energized as described herein causing the inner and outer plates of pilot clutch 38 to move towards each other. This action creates drag forces across the surface of pilot clutch 38. As drag in pilot clutch 38 is created, rotation of clutch cam 40 is slowed causing relative rotation of clutch cam 40 against cam sleeve assembly 42. The difference in rotation of clutch cam member 40 relative to cam sleeve assembly 42 causes cam sleeve assembly 42 to move axially biasing (releasing) the compressed biasing member 44 in a second direction which causes it to engage output shaft 46 with input shaft 48.

FIGS. 3 and 4 show exploded and assembled views respectively of the disconnect system 32. As can be seen, the disconnect system is compact and co-axial. As can be seen, disconnect system 32 can engage one or more shafts of a vehicle using vehicle power or inertia without the need for an external motor or other power source, thereby reducing the cost, complexity and surface area of the system. The reduced surface area may reduce the response time of the system to less than 70 milliseconds and further results in low spin loss as the increased speed of the vehicle results in increased rotation of one or more of the cams 40, 42. Cam sleeve assembly 42 which handles the shifting can do this shift at higher speeds. Accordingly, the faster the speed of the vehicle, the faster disconnect system 32 can be engaged and disengaged. Furthermore, the system is internally co-axial as there is no separate parallel axis for the power source and the shift fork is eliminated, resulting in reduced package space. The system also does not require a high tolerance acme screw as it uses PM gears and ramps.

Further advantages include that the system results in lower power consumption (on the order of 3 to 4 amperes for millisecond intervals) due to the recycling of power from the vehicle drive shaft and the use of the coil to connect and disconnect the all-wheel drive system. The system either has an engaged or disengaged position with no middle engagement position. As a result, power loss during the actuation process would result in the cam members 40, 42 defaulting to either an engaged or disengaged position with detent positions such as detent positions 74 to hold the cams 40, 42 in either the engaged or disengaged positions without the need for motor brake or current to hold the disconnect components in a specific state. The use of the clutch 38 results in reduced torque trap issues and increases durability during a delta shift. In at least some embodiments, disconnect system 32 may use back taper teeth on the clutch 38 to enhance engagement and the connection of the shafts. These and other advantages are applicable to additional embodiments of the present disclosure.

Figure 5A:
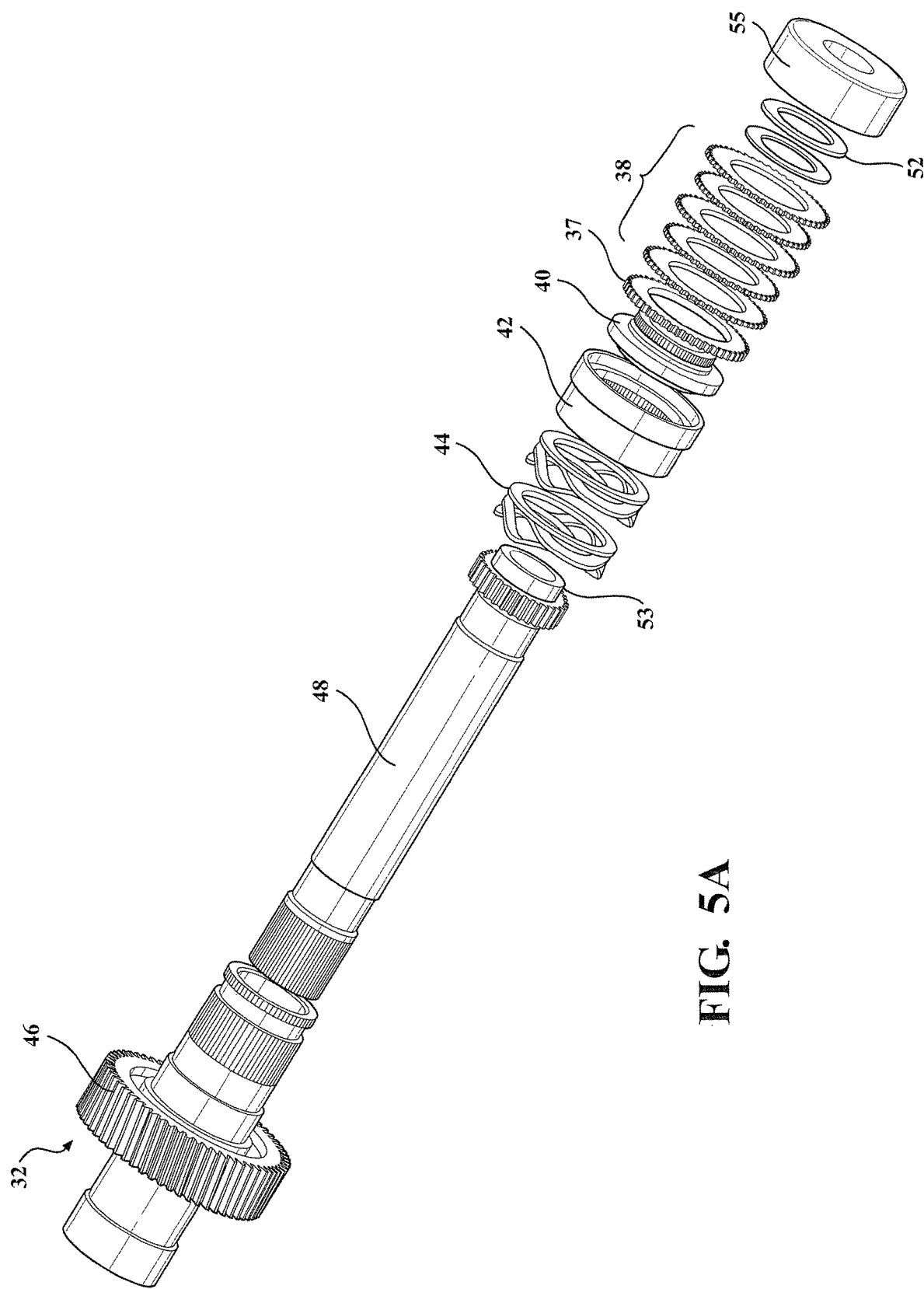
FIG. 5A illustrates an exploded view of a disconnect system according to another embodiment of the present disclosure.
Figure 5B:
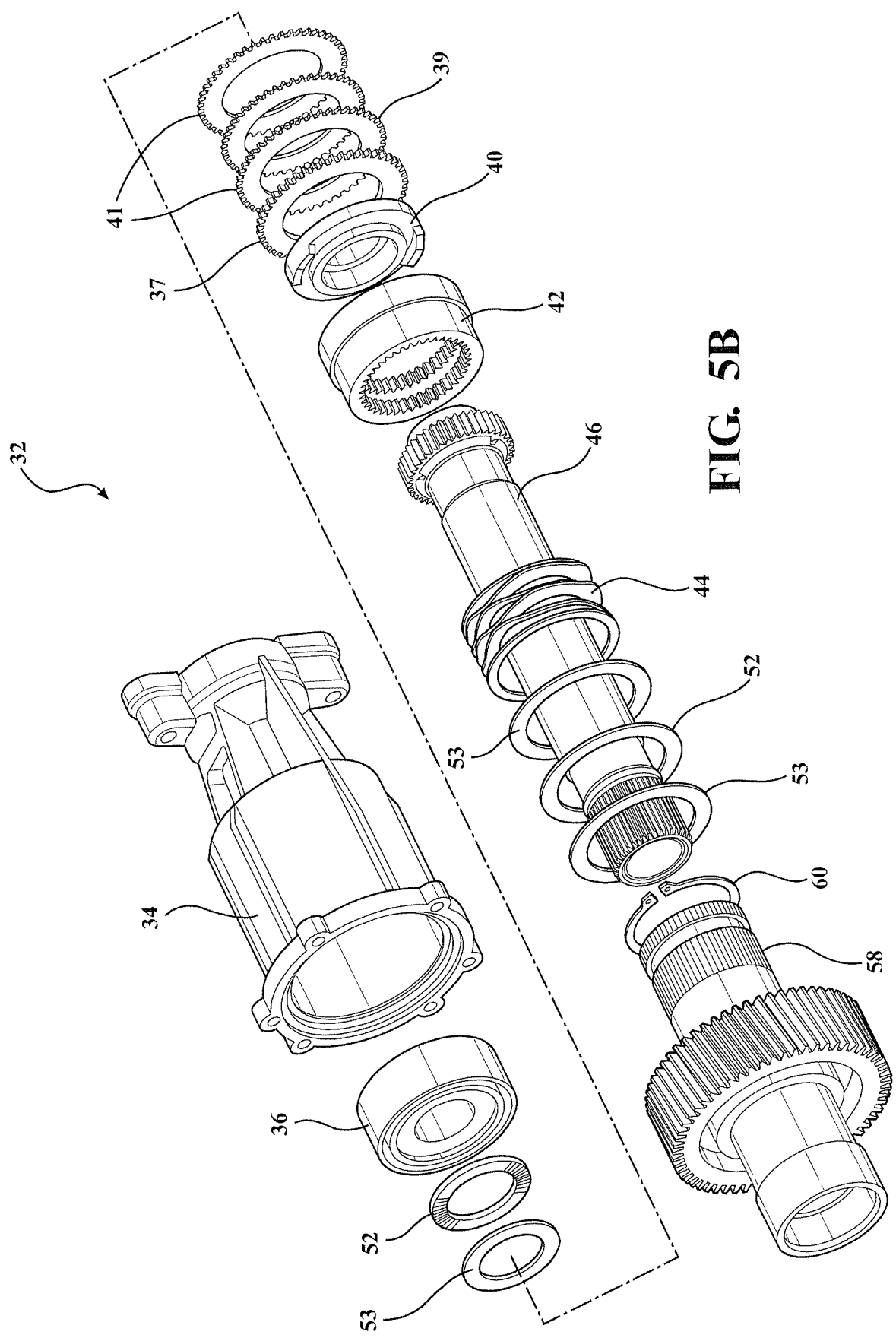
FIG. 5B illustrates a further exploded view of the disconnect system of FIG. 5A.

Referring now to FIGS. 5 to 7, another embodiment of disconnect system 32 is disclosed. The embodiments shown in FIGS. 5 to 7 include the features shown in FIG. 2A or functionally identical features. Identical reference numerals are used to show identical or highly similar features. As seen in FIG. 5B, the disconnect system 32 also includes one or more helical gears 58 and a retaining ring 60 that may be part of transmission 22.

Figure 6A:
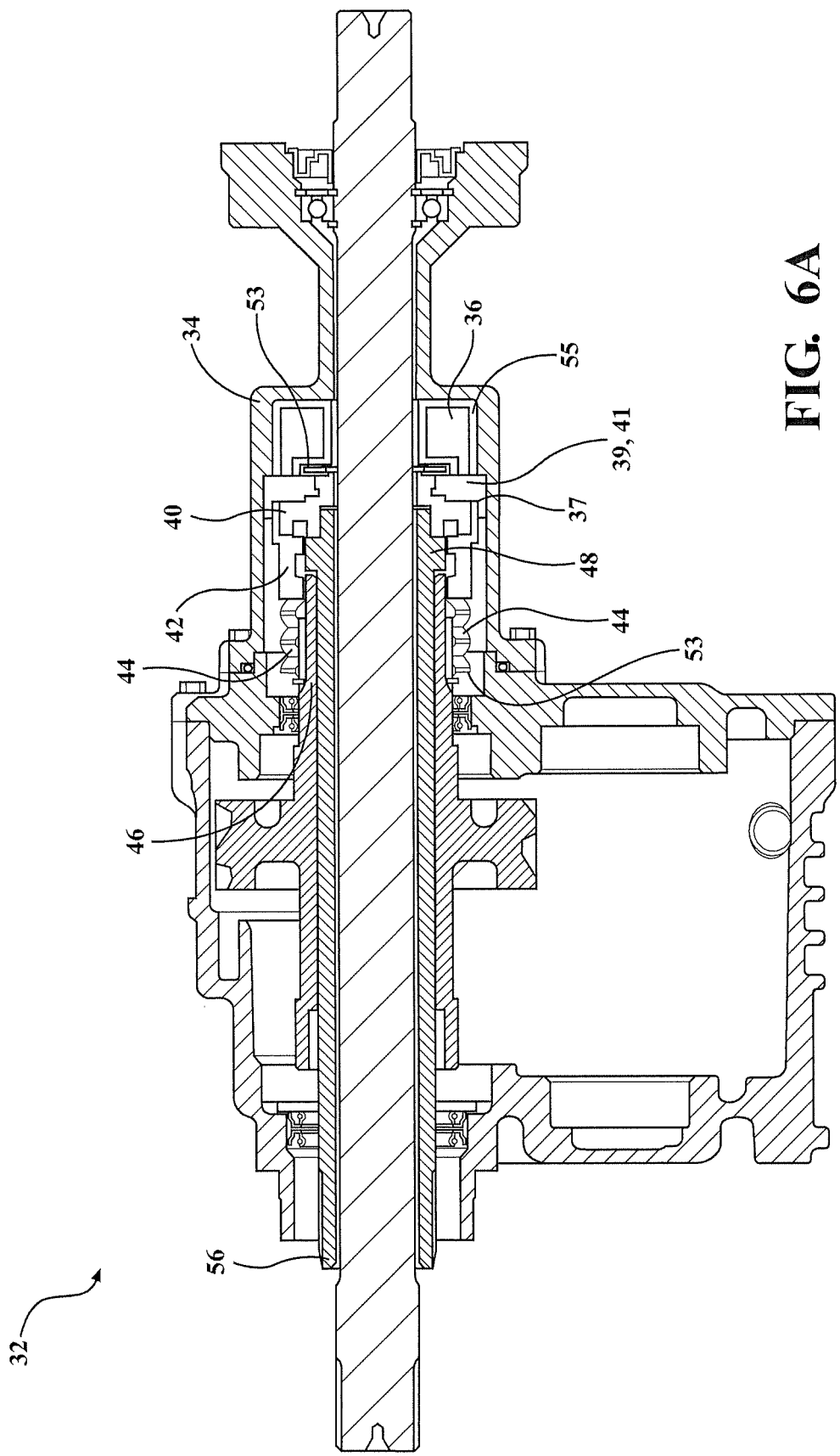
FIG. 6A is a cross sectional view of the disconnect system of FIG. 5A.
Figure 6B:
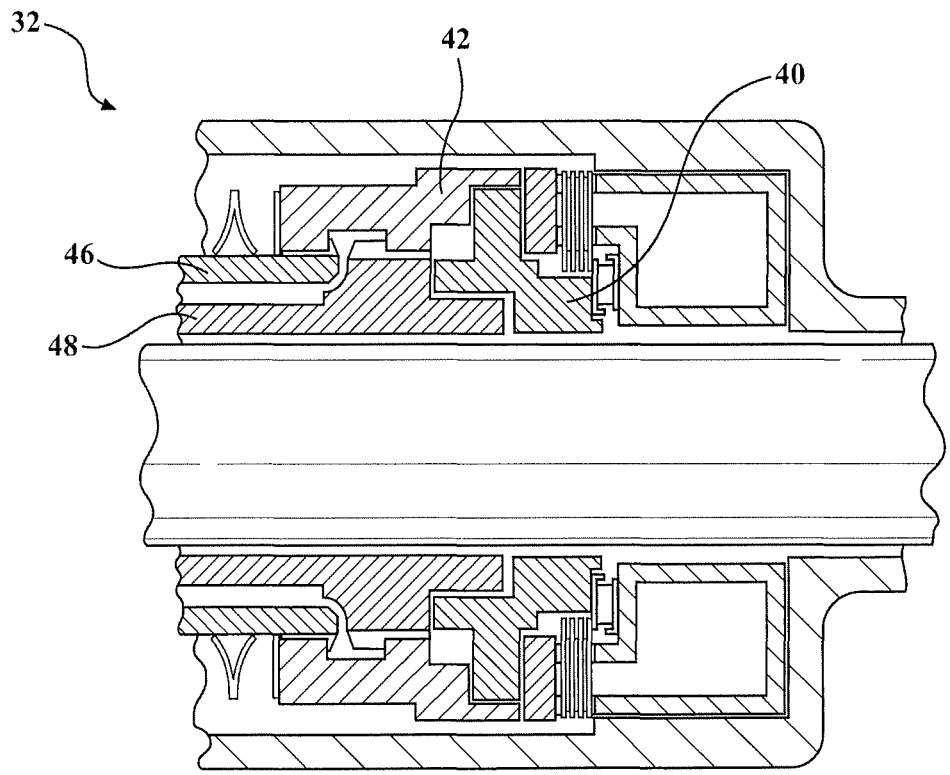
FIG. 6B is a cross sectional view of the disconnect system of FIG. 5A in a first engaged position.
Figure 6C:
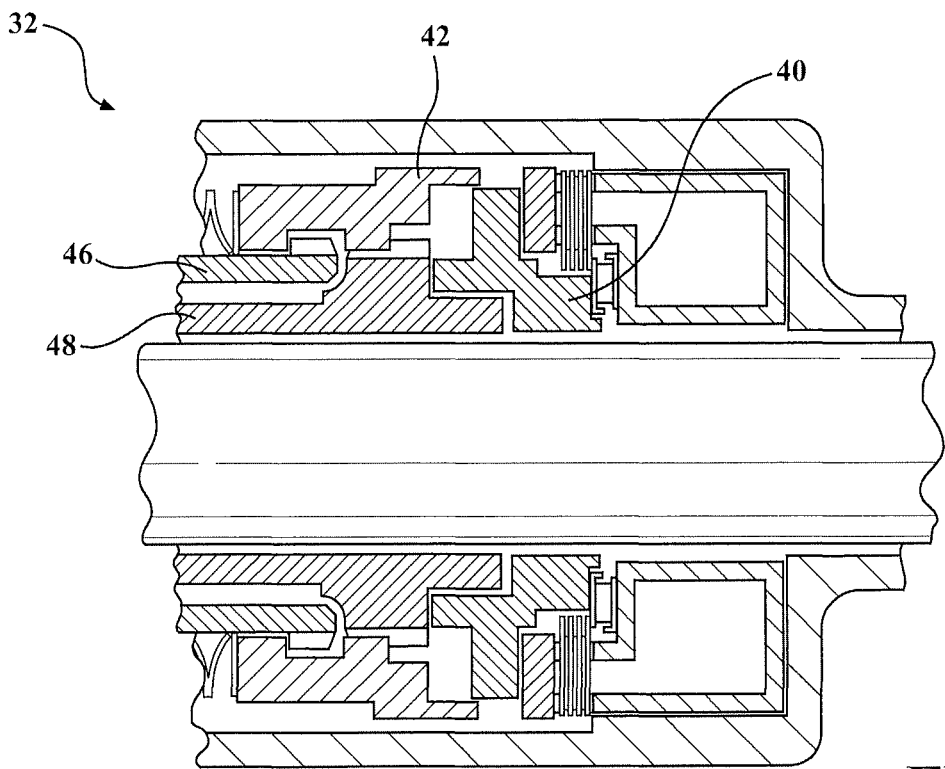
FIG. 6C is a cross sectional view of the disconnect system of FIG. 5A in a second disengaged position.
Figure 6D:
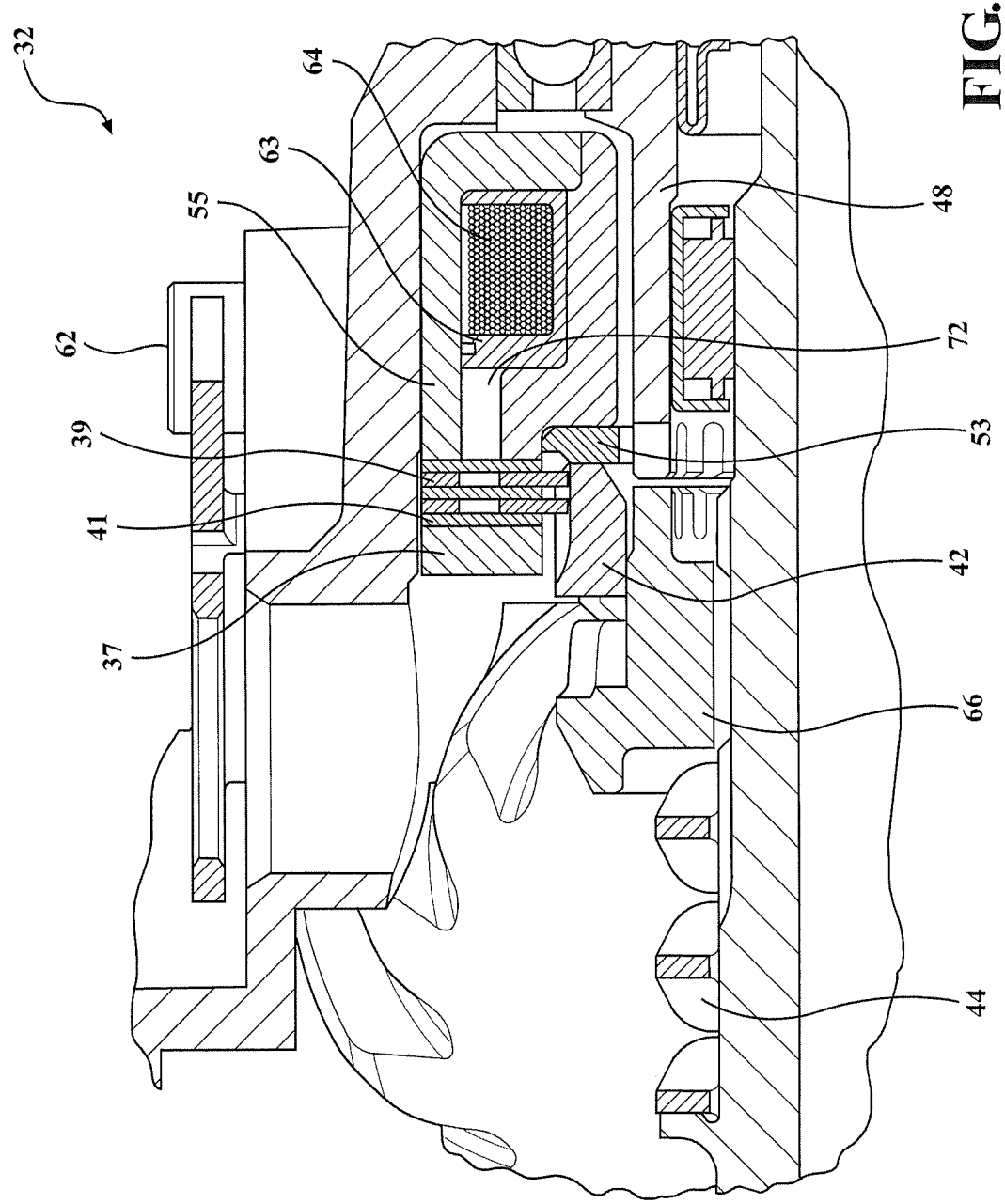
FIG. 6D is a cross sectional view of a disconnect system in accordance with another example embodiment of the present disclosure.

FIGS. 6A and 6D show a cross-section view of the disconnect system 32 in accordance with another embodiment of the present invention. Disconnect system 32 includes a transmission input 56 which may be operatively connected to input shaft 46. System 32 also includes an output (or driven) shaft connected to the rear wheels of the vehicle. A joint may be disposed between the input shaft 48 and the outer shaft 46 as the input shaft 48 and output shaft 46 are not permanently connected to each other. Upper cam 42, which in some embodiments is functionally identical to cam sleeve assembly 42, is a spline cam that in some embodiments may perform one or more functions. In at least some example embodiments, the upper cam 42 spans the input and output shafts 48, 46 when the upper cam 42 is engaged and upper cam 42 couples the input and driven shafts 48, 46. In some embodiments, upper cam 42 is connected to input shaft 48 by one or more cam connectors 66 (shown in FIG. 6D). In operation, this results in an upper cam 42 that possesses a bi-stable profile which includes both an engaged and disengaged position. In the embodiment shown in FIG. 6A, both shafts 46, 48 are fixed and operate independently relative to each other except for being operatively connected by the engagement of the upper cam 42.

The upper cam 42 may also include a cam feature located on the cam member that interfaces with the lower cam 40, which in some embodiments is functionally identical to clutched cam member 42. The upper and lower cam members 42, 40 are stationary relative to each other but rotate with the input shaft 48.

Engagement or disengagement occurs when upper cam 42 moves axially to engage the output shaft 46. The cam profile drives the axial movement of the upper cam 42 and the relative rotation of the cam members 42 and 40 drives the movement of the entire cam assembly.

Disconnect system 32 also includes a pilot clutch 38 comprising inner and outer clutch plates 39, 41 that perform identical clutch functions as described above and an armature 37. In the embodiment shown in FIG. 6A, disconnect system 32 includes a coil housing 55 that may house at least a portion of the coil 36. In some embodiments, disconnect system 32 may also include a coil connector subassembly 62 (FIG. 6D) that connects various components of the coil 36.

In operation, the upper cam 42 rotates at the same speed as the input shaft 48. The lower cam 40 rotates at variable speeds. The lower cam 40 rotates at the same speed as the input shaft 46, except during engagement or disengagement of the upper cam 40. To facilitate this shift from rotational to axial movement, relative rotation of the cam members 42, 40 is required. The speed of rotation of the lower cam 40 is reduced by pilot clutch 38 which is activated by the electromagnetic coil 36 to selectively engage with the lower cam 40. The selective engagement of the lower cam 40 by the clutch 38 relative to the lower cam 40 reduces the rotation of the lower cam 40. The rotational movement of the lower cam 40 is then converted to axial movement, which in combination with the input shaft 48 rotates the upper cam 42 relative to the lower cam 40 to engage and disengage the input and output shafts 48, 46 to selectively connect and disconnect the AWD assembly. In some embodiments, the electromagnetic coil 36 operates as a pilot clutch to directly selectively engage and disengage one of the cam members 40, 42 to translate rotational movement of the cam members 40, 42 to axial movement.

In the engaged position shown in FIG. 6B, upper cam 42 is splined to both the input shaft 48 and output shaft 46, and spans the input and driven shafts 48, 46 thus powering the front and rear wheels of a vehicle such as for example front and rear wheels 12 and 14. In some embodiments, this results in all wheel drive operation. In the engaged position, shown in FIG. 6B, the upper cam 42 is splined to both the input shaft and the main driven shaft thus allowing both cams 40, 42 to operate at the same speed.

In the disengaged position shown in FIG. 6C, the upper cam 42 is disconnected from the input and driven shafts 48, 46, thus severing the connection between the input and driven shafts 48, 46 and disconnecting the all-wheel drive. In some embodiments, the input shaft 48 may be connected to the rear wheels 14 resulting in rear wheel drive when all wheel drive system is disconnected. In the disengaged position, the upper cam 42 spline is disengaged from the output shaft 46 allowing the clutch to engage the lower cam to reduce the speed of rotation of the lower cam 40.

In operation, in the disengagement state shown in FIG. 6C, the coil 36 engages with the clutch 38 by contacting one or more of the clutch plates 39, 41 to break rotation of lower cam 40. This action urges the shift sleeve assembly 54 comprised of the upper and lower cams 42, 40 towards biasing member (spring) 44 which is charged with the energy from the vehicle in the same manner as described above, and which disengages the output shaft 46 from the input shaft 48 by engaging with the upper cam 42. In at least some embodiments, the energy from the vehicle is in the form of rotational energy from the input shaft 48. In a subsequent engagement cycle, shown in FIG. 6B, the coil 36 is re-activated causing the biasing member 44 to be released and to engage the upper cam 42. Upper cam 42 then spans the input and output shafts 48, 46 to engage the input and output shafts 448, 46.

To move from the engaged to disengaged position, the upper cam 42 must traverse a ramp portion. This provides a built in detent for the upper cam 42 as to traverse the ramp requires torque to overcome the physical barrier between the upper and lower cams 42, 40.

Figure 5C:
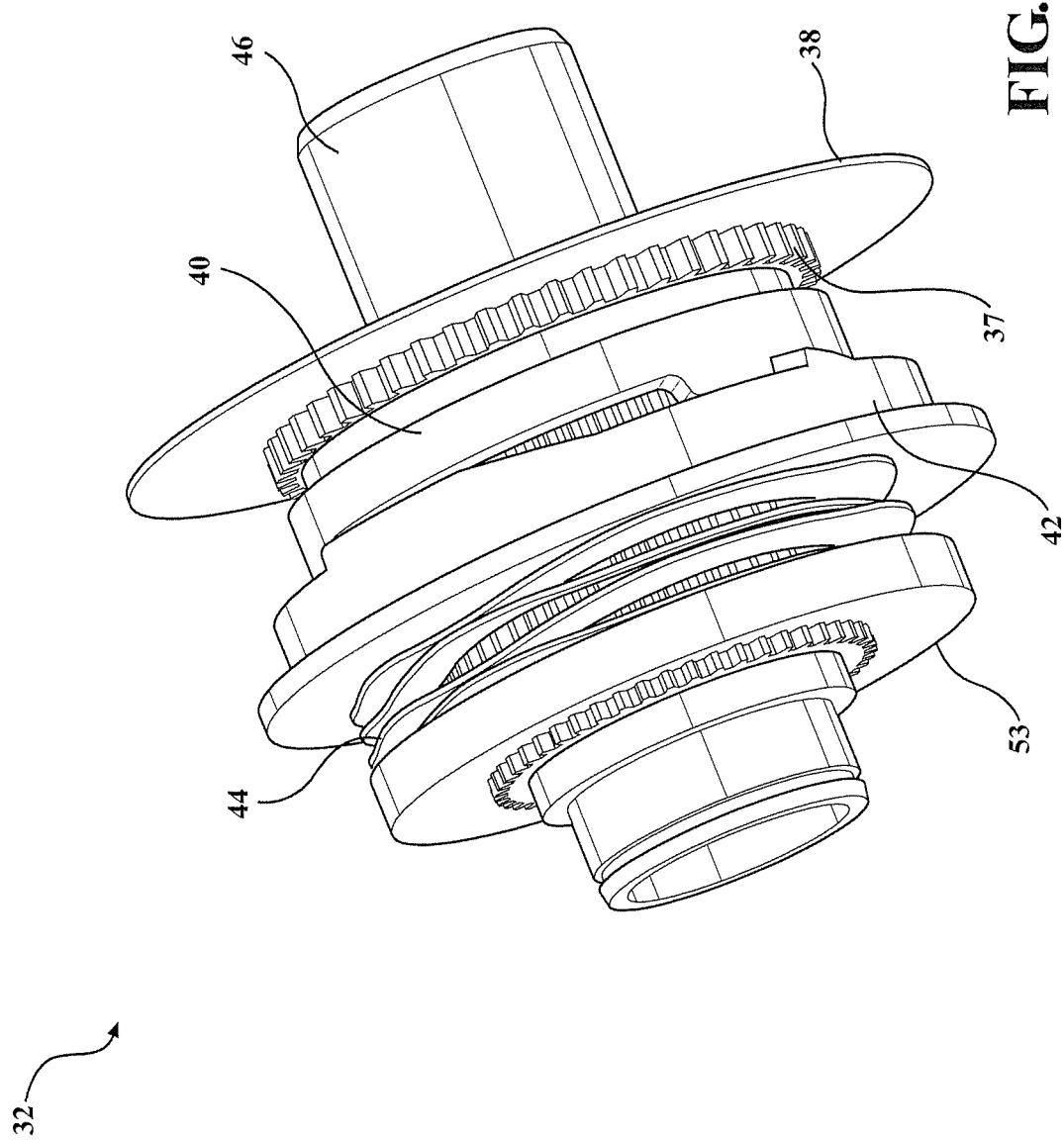
FIG. 5C illustrates an assembled view of a portion of the disconnect system of FIG. 5A.

FIG. 5C is an assembled view of disconnect system 32 which more clearly shows that upper cam 42 and thrust washer 53 are splined to the input shaft 48 which runs through the center of the lower and upper cams 40, 42. The upper cam 42 and thrust washer may be splined to input shaft 48 in a number of ways including through a splined and grounded connection. As shown in FIG. 3, lower cam 40 has an internal diameter pilot connection to input shaft 48 and an outer diameter spline connection to the inner clutch plates 39 of pilot clutch 38. Thus, lower cam 40 and pilot clutch 38 are not splined to the input shaft 48 but are instead piloted to the input shaft 48. In operation, the input shaft 48 drives the rotation of the components of the disconnect system 32. The energizing of the electromagnetic coil 36 by input shaft 48 causes drag between the clutch plates 39, 41 or pilot clutch 38 resulting in the upper cam 42 compressing the biasing member 44 thus disengaging the output shaft 46 from the input shaft 48 as described herein. One or more of the clutch plates 39, 41 is grounded to disconnect housing 34. A subsequent energizing of the coil as described above results in upper cam 42 being similarly indexed, thus releasing the biasing member 44 and resulting in engagement of the input and output shafts 48, 46.

As described herein, in this embodiment, disconnect system 32 includes a sensor such as sensor 50 shown in FIG. 2A. The sensor 50 may similarly be a part of a control system (not shown) that monitors the position of the upper cam 42 to determine whether the upper cam 42 is connected or disconnected. The position sensor 50 on the upper cam 42 is used to control whether the coil 36 is energized and the duration of the engagement of the upper cam 42. The control system may include a controller (not shown) for determining a connection state of an all wheel drive assembly. The controller may include a number of components including a memory; a wireless communications subsystem; and a processor configured to connect and disconnect an all wheel drive state of an all wheel drive assembly of a vehicle in response to external conditions of a driving environment.

Figure 7A:
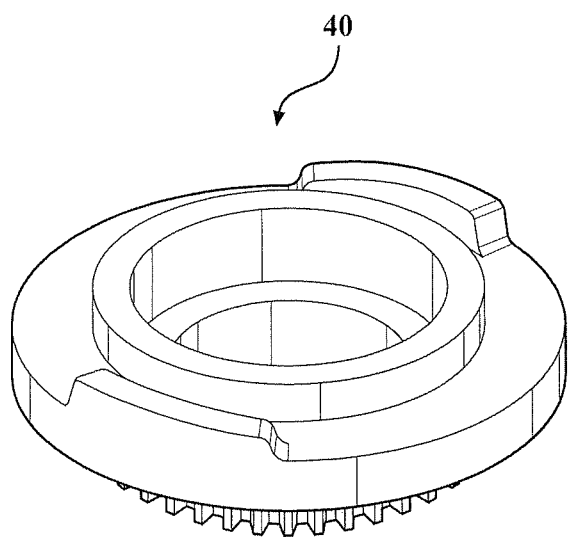
FIGS. 7A-7C illustrate example cam members which may be used in the disconnect systems of the present disclosure.
Figure 7B:
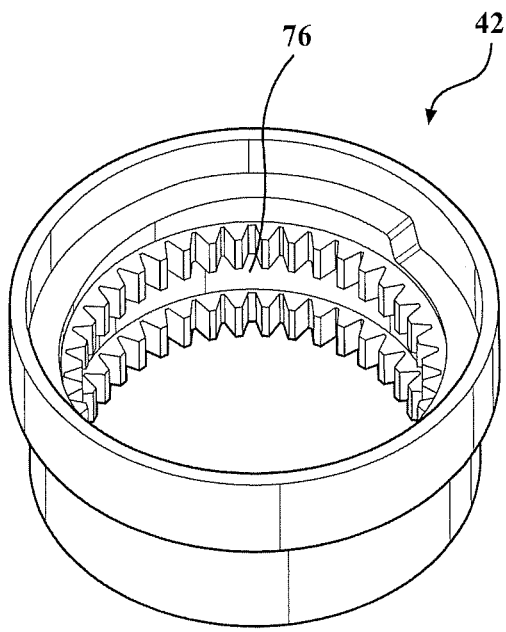
Figure 7C:
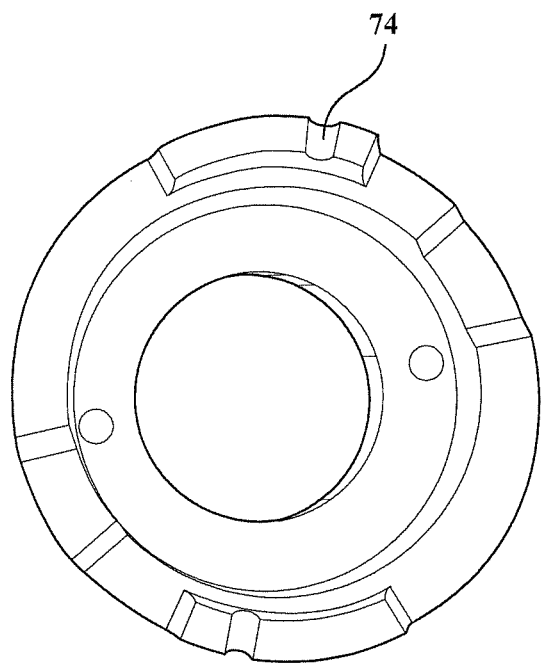

Referring now to FIGS. 7A to 7C, illustrations of the upper and lower cams 42, 40 are disclosed. Upper and lower cams 42, 40 are designed for approximately 4.5 mm of axial movement. The engagement profile (an example of which is shown in FIG. 9A) is a steep drop-off for a fast shift. The disengagement profile is a gradual ramp as rapid disengagement is not required. In some embodiments, a detent is included at the top of the cam members for a positive load configuration to hold the upper and lower cams 42, 40 together and to prevent motion of one or more of the cam members 42, 40. In some embodiments, as described herein, a built-in detent may be used to control motion of one or more the cam members.

Referring now to FIGS. 8A and 8B, a cross-sectional view of another embodiment of a disconnect system 80 is disclosed. As seen in FIG. 9A, in this embodiment, vehicle motion rotates a ball ramp to engage or disengage one or more shafts. Located in a PTU such as PTU 24, the disconnect system 80 comprises a self-energizing coil 82 used to connect and disconnect the output of the PTU such as PTU 24 of an AWD disconnect system.

Figure 9B:
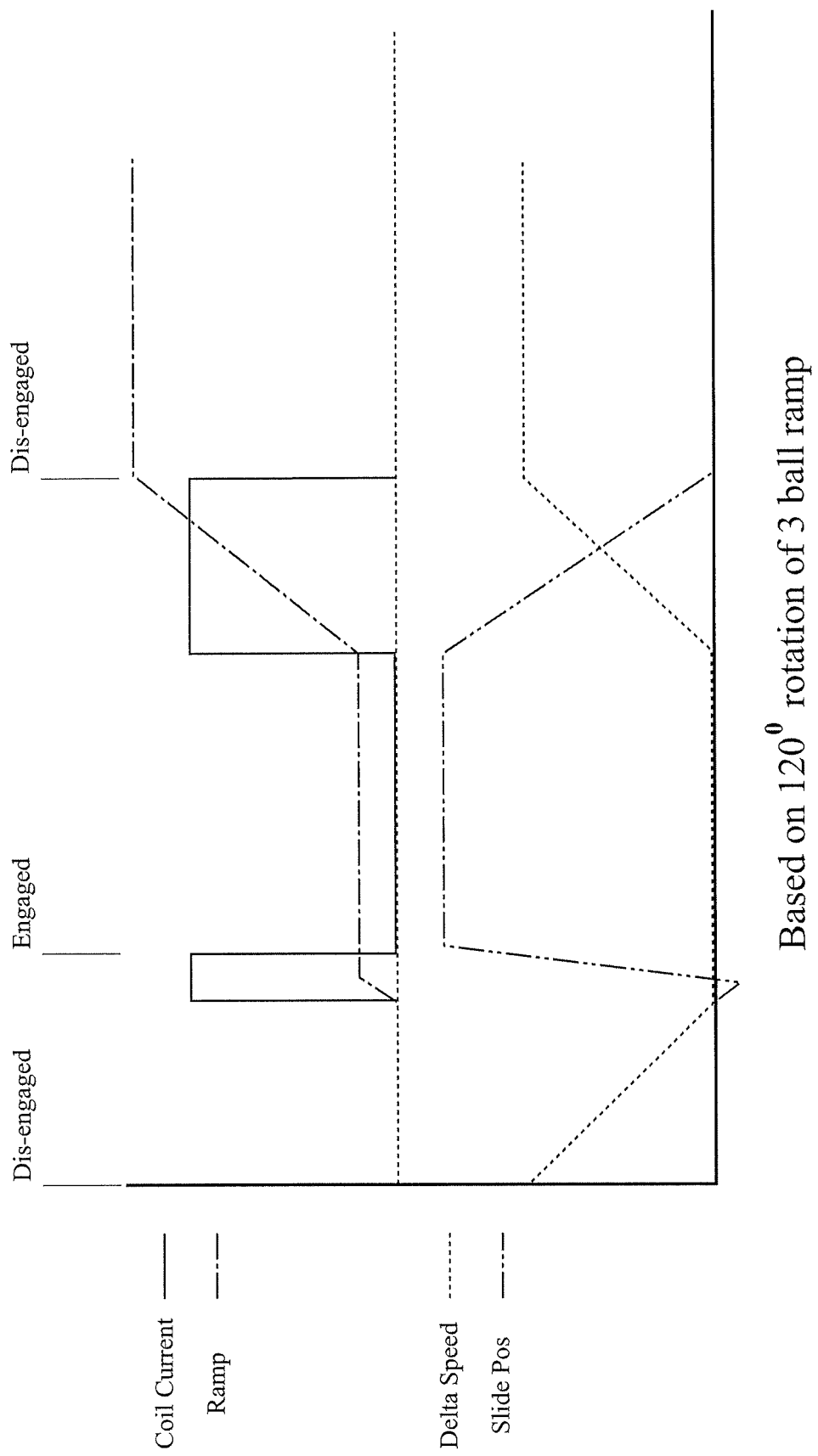
FIG. 9B is a graph showing characteristics of the disconnect system of FIG. 9A.

The inner plates (not shown in this embodiment, but which may be similar to inner plates 39) of pilot clutch 81, are connected to a rotational cam 84 which performs similar functions to cam sleeve assembly (upper cam) 42. The outer plates (not shown in this embodiment, but which may be similar to outer plates 41) of pilot clutch 81 are connected to an end of pilot drum 99. A second end of pilot drum 99 is connected to and rotates with actuator slide 86 but does not move axially with actuator slide 86. Actuator slide 86 performs similar functions to clutched cam and lower cam 40. Rotational cam 84, which may have balls or rollers on the face, contacts a cam profile on the face of actuator slide 86. Rotational cam 84 connected to actuator slide 86 converts rotary motion of rotational cam 84 into axial motion of actuator slide 86. Actuator slide 86 is similarly connected to a biasing member such as spring 94 which is compressed when actuator slide 86 moves in an axial direction. Actuator slide 86 is also fixed from rotation relative to housing 98 but is configured to slide relative to housing 98. A clutch slide 90 is connected to actuator slide 86 and moves axially with actuator slide 86 but is allowed to rotate freely relative to actuator slide 86. Clutch slide 90 is connected to a main shaft 92 (which performs similar functions to input shaft 48) and rotates with main shaft 92 but is allowed to move axially relative to main shaft 92. Clutch slide 90 has gear teeth (not shown, but which may be similar to teeth 76) on the face and mates with similar tooth profile on transmission output 97. In at least some example embodiments, disconnect system 80 also includes a linear position transducer 96, which in some embodiments may be a linear variable differential transformer (LVDT) that converts the rotational motion of the main shaft 92 into a corresponding electrical signal for powering coil 82. Transducer 96 contacts a ramp feature on actuator slide 86 (seen in FIG. 9A). A graph showing the profile of the ramp, coil current, delta speed and position of actuator slide 86 is shown in FIG. 9B.

In operation, to disconnect main shaft 92 from output 97, coil 82 is energized causing the inner and outer plates of pilot clutch 81 to be urged together creating drag between the inner and outer plates. While the vehicle is in motion, main shaft 92 is rotating since it is connected through the rest of the driveline and transmission. Pilot drum 99 is connected to actuator slide 86 and actuator slide 86 is connected to main shaft 92 so that pilot drum 99 is rotating at the same speed as main shaft 92. Rotational cam 84 is not connected to any rotating components except through pilot clutch 81. As drag in the pilot clutch 81 is created, rotation from the pilot drum is transferred to rotational cam 84 causing the rotational cam 84 to rotate against actuator slide 86. The rotation of the cam 84 causes actuator slide 86 to move axially resulting in spring 94 being compressed and also disengaging main shaft 92 from output shaft 97.

To connect the PTU 24 (i.e. main shaft 92 to output 97), a modulating clutch (not shown) in the RDM 30 is activated thereby synchronizing the disconnected portion of the driveline (either front or rear driveline 16, 18) to match the speed of transmission output 97. During this synchronization, the main shaft 92 in the PTU 24 rotates to come up to this speed. Coil 82 is energized causing the inner and outer plates of pilot clutch 81 to come together creating drag across pilot clutch 81. The pilot drum 99 is connected to clutch slide 90 which rotates with main shaft 92. The rotation of pilot drum 99 is transferred across pilot clutch 81 and rotates rotational cam 84. As rotational cam 84 rotates, the mating cam face on actuator slide 86 reaches a sharp transition allowing spring energy from spring 94 to be released and moves actuator slide 86 towards transmission output 97 and connects main shaft 92 and output shaft 97 through gear teeth on the face of the shafts 92, 97.

In at least some embodiments, the disconnect system may use balls or rollers disposed on one or more cams to engage or disengage the input and output shafts. As seen in FIG. 12, in this embodiment, vehicle motion rotates a ball ramp to engage or disengage the one or more shafts. Referring to FIGS. 10 to 12, there is disclosed another embodiment of a disconnect system 100. The disconnect system 100 may similarly be located in a PTU such as PTU 24 and is used to connect and disconnect the output such as output 26 of the PTU 24 of an AWD disconnect system.

In the embodiment shown in FIGS. 10A to 11B, disconnect system 100 is powered by a motor 102 which may drive a main shaft 104. Motor 102 is connected to drive gear 106, which, through a gear ratio is connected to rotational cam 108. Rotational cam 108 contains a geared feature on the outer circumference and meshes with drive gear 106. Rotational cam 108, which may have balls (FIGS. 10A and 10B) or rollers (FIGS. 11A and 11B) on the face of rotational cam 108 contacts a cam profile on the face of actuator slide 110. Rotational cam 108 is connected to actuator slide 110 and converts rotary motion of rotational cam 108 into axial motion of actuator slide 110. Actuator slide 110 is connected to a biasing member (spring) 112 and is compressed when actuator slide 110 moves in an axial direction. Actuator slide 110 is also fixed from rotation by a splined connection to a housing 114 but is allowed to move axially relative to housing 114. Clutch slide 116 is connected to actuator slide 110 and moves axially with actuator slide 110 but is allowed to rotate freely relative to actuator slide 110. Clutch slide 116 is connected to main shaft 104 and rotates with main shaft 104 but is allowed to move axially relative to main shaft 104. Clutch slide 116 has gear teeth on the face and mates with similar tooth profile on a transmission output 118. Disconnect system 100 also includes a linear position transducer 118 similar to transducer 96 and which contacts a ramp feature on actuator slide 110.

As in other embodiments, in the connected state, when motor 102 rotates, rotational cam 108 is rotated through its connection with drive gear 106. Rotational cam 108, in contact with actuator slide 110, converts its rotational motion into axial motion of actuator slide 110 according to a cam profile of actuator slide 110. As actuator slide 110 moves axially, spring 112 or a similar biasing member compresses until the cam profile of actuator slide 110 enters a detent position. In this position, spring 112 is fully compressed. Clutch slide 116 moves with actuator slide 110 when compressing the spring and disengages the face clutch teeth out of mesh with transmission output 118, disconnecting PTU 24 from transmission 22.

To connect the PTU 24, motor 102 rotates further causing rotational cam 108 to rotate relative to the cam profile on actuator slide 110 into an area of disconnect system 32 where a sharp transition in movement may occur. As rotational cam 108 moves into this profile, the sharp transition allows actuator slide 110 to quickly move towards the rotational cam 108 due to rapid release of energy from compressed spring 112. As actuator slide 110 moves towards rotational cam 108, the clutch slide 116 moves with actuator slide 110 and engages the gear teeth on the face of clutch slide 116 to the transmission output 9. Transducer 120 is used for feedback control to determine the position and engagement status of actuator slide 110.

The invention has been described in relation to an AWD disconnect system. However, the present invention can be used for a front axle disconnect other disconnect system. The invention has been described in an illustrative manner, and it is to be understood that the terminology, which has been used, is intended to be in the nature of words of description rather than of limitation. Many modifications and variations of the present invention are possible in light of the above teachings. Various embodiments and sub-embodiments may be combined. It is, therefore, to be understood that within the scope of the appended claims, the invention may be practiced other than as specifically described. The subject matter described herein and in the recited claims intends to cover and embrace all suitable changes in technology.

The invention claimed is:

1. A disconnect system for selectively engaging and disengaging one or more shafts, the disconnect system comprising:
   an input shaft;
   an output shaft;
   a cam sleeve assembly having a first cam member driveably connected to one of the input shaft or the output shaft so that the first cam member is configured to rotate at the same speed as the input shaft or the output shaft to which it is connected while being movable axially relative thereto, the first cam member including first spline teeth on an internal diameter of the first cam member configured to meshingly engage with second spline teeth on an outer diameter of the other one of the input shaft or the output shaft, and the first cam member including a first cam feature having a bi-stable cam profile with an engaged portion and a disengaged portion;
   a second cam member having a second cam feature interfacing with the first cam feature of the first cam member, the second cam member driveably connected to the first cam member and configured to rotate at variable speeds relative to the first cam member, wherein the first cam member is axially stationary when the first cam member and the second cam member rotate at the same speed with the second cam feature aligned with one of the engaged portion and the disengaged portion of the first cam feature, and wherein the first cam member is movable axially by the second cam member when the second cam member rotates at a speed different than the first cam member such that the second cam feature is rotated relative to the first cam feature so that the second cam feature is repositioned to align with an other one of the engaged portion and the disengaged portion;
   at least one clutch driveably connected to the second cam member, which is selectively actuatable to vary the speed of rotation of the second cam member relative to the first cam member to selectively rotate the second cam feature relative to the first cam feature causing the first cam member to move axially between an engaged position and a disengaged position; and
   a coil driveably connected to the at least one clutch to selectively actuate the at least one clutch and vary the speed of rotation of the second cam member;
   wherein when the second cam feature is aligned with the engaged portion of the first cam feature, the first cam member is repositioned to the engaged position and the first cam member connects the input shaft and the output shaft together for mutual rotation by meshingly engaging the first spline teeth on the first cam member with the second spline teeth on the other one of the input shaft or the output shaft;
   wherein when the second cam feature is aligned with the disengaged portion of the first cam feature, the first cam member is displaced to the disengaged position which disconnects the output shaft from the input shaft by disengaging the first spline teeth on the first cam member from the second spline teeth on the other one of the input shaft or the output shaft; and wherein the coil is selectively energized and de-energized, and the coil activates and deactivates the at least one clutch, by which the at least one clutch selectively engages and disengages rotation of the second cam member relative to the first cam member to translate a rotational movement of the second cam member to an axial movement of the first cam member such that the relative rotation of the first cam member relative to the second cam member operates to engage and disengage the output shaft and the input shaft.

2. The disconnect system of claim 1 wherein the coil is electromagnetically actuated.

3. The disconnect system of claim 1 or claim 2 further comprising a biasing member operatively coupled to at least one of the first cam member and the second cam member for biasing the first cam member and the second cam member together.

4. The disconnect system of claim 3 wherein the biasing member is a spring.

5. The disconnect system of claim 1 wherein the disconnect system further comprises a housing at least partially surrounding the disconnect system.

6. The disconnect system of claim 1 further comprising a control system configured to control the selective engagement and disengagement of the coil.

7. The disconnect system of claim 1 wherein the output shaft is the output of any one of a powertrain unit and an axle.

8. The disconnect system of claim 1 wherein the axial movement of the second cam member is controlled by a detent mechanism.

9. The disconnect system of claim 8 wherein the detent mechanism comprises a ramp traversing a distance between the first cam member and the second cam member.

10. A vehicle comprising the disconnect system of claim 1.

11. A disconnect system for selectively engaging and disengaging one or more shafts, the disconnect system comprising:
an input shaft;
an output shaft;
a cam sleeve assembly having a first cam member driveably connected to one of the input shaft or the output shaft so that the first cam member is configured to rotate at the same speed as the input shaft or the output shaft to which it is connected while being movable axially relative thereto, the first cam member including first spline teeth on an internal diameter of the first cam member configured to meshingly engage with second spline teeth on an outer diameter of the other one of the input shaft or the output shaft, and the first cam member including a first cam feature having a bi-stable cam profile with an engaged portion and a disengaged portion;
a second cam member having a second cam feature interfacing with the first cam feature of the first cam member, the second cam member driveably connected to the first cam member and configured to rotate at variable speeds relative to the first cam member, wherein the first cam member is axially stationary when the first cam member and the second cam member rotate at the same speed with the second cam feature aligned with one of the engaged portion and the disengaged portion of the first cam feature, and wherein the first cam member is movable axially by the second cam member when the second cam member rotates at a speed different than the first cam member such that the second cam feature is rotated relative to the first cam feature so that the second cam feature is repositioned to align with an other one of the engaged portion and the disengaged portion;
at least one clutch driveably connected to the second cam member, which is selectively actuatable to reduce the speed of rotation of the second cam member relative to the first cam member to selectively rotate the second cam feature relative to the first cam feature causing the first cam member to move axially between an engaged position and a disengaged position; and
a power source driveably connected to the at least one clutch to selectively actuate the at least one clutch and varies the speed of rotation of the second cam member wherein the power source activates and deactivates the at least one clutch, by which the at least one clutch selectively engages and disengages rotation of the second cam member relative to the first cam member to translate a rotational movement of the second cam member to an axial movement of the first cam member such that the relative rotation of the first cam member relative to the second cam member operates to engage and disengage the output shaft and the input shaft, wherein when the second cam feature is aligned with the engaged portion of the first cam feature, the first cam member is displaced to the engaged position and the first cam member connects the input shaft and the output shaft together for mutual rotation by meshingly engaging the first spline teeth on the first cam member with the second spline teeth on the other one of the input shaft or the output shaft; and wherein when the second cam feature is aligned with the disengaged portion of the first cam feature, the first cam member is repositioned to the disengaged position which disconnects the output shaft from the input shaft by disengaging the first spline teeth on the first cam member from the second spline teeth on the other one of the input shaft or the output shaft.

12. The disconnect system of claim 11 further comprising a biasing member operatively coupled to the second cam member for biasing the first cam member and the second cam member together.

13. The disconnect system of claim 11 or 12 wherein the first cam member and the second cam member are one or more of a ball cam and a roller cam.

14. The disconnect system of claim 11 further comprising a control system configured to control the selective engagement and disengagement of the one or more of the first cam member and the second cam member.

15. The disconnect system of claim 11 wherein the axial movement of the second cam member is controlled by a detent mechanism.

16. A vehicle comprising the disconnect system of claim 11.

* * * * *